(12) United States Patent
Singh

(10) Patent No.: US 7,920,489 B1
(45) Date of Patent: Apr. 5, 2011

(54) SIMULTANEOUS RECEIVING AND TRANSMITTING OF DATA OVER A NETWORK

(75) Inventor: Vijay Singh, Sunnyvale, CA (US)

(73) Assignee: Net App, Inc., Sunnyvale, CA (US)

( * ) Notice: Subject to any disclaimer, the term of this patent is extended or adjusted under 35 U.S.C. 154(b) by 839 days.

(21) Appl. No.: 11/855,818

(22) Filed: Sep. 14, 2007

(51) Int. Cl.
*H04B 1/56* (2006.01)
(52) U.S. Cl. .................. 370/276; 370/356; 709/215
(58) Field of Classification Search .................. None
See application file for complete search history.

(56) References Cited

U.S. PATENT DOCUMENTS 6,347,337 B1 * 2/2002 Shah et al. .............. 709/224
2007/0180310 A1 * 8/2007 Johnson et al. ............ 714/12
2007/0274296 A1 * 11/2007 Cross et al. ............. 370/356
* cited by examiner

*Primary Examiner* — Huy D Vu
*Assistant Examiner* — Kibrom T Hailu
(74) *Attorney, Agent, or Firm* — Stattler-Suh PC

(57) ABSTRACT

Embodiments herein provide full duplex operation (i.e., simultaneous receiving and transmitting of data over a network) of a network device of a computer system. Receiving and transmitting threads are used for receiving and transmitting data using the network device, the threads requiring access to an associated data structure to use the network device. Conventionally, the data structure is locked to allow access to only one thread at a time to protect against information inconsistencies in the data structure. Some embodiments remove the locking feature of the data structure to provide simultaneous access to the data structure by the receiving and transmitting threads, and thus allow full duplex operation of the network device. Protections against information inconsistencies in the data structure may be provided, including providing separate receiving and transmitting information sections in the data structure and assurances that only one transmitting thread accesses the data structure at any time.

21 Claims, 12 Drawing Sheets

SIMULTANEOUS RECEIVING AND TRANSMITTING OF DATA OVER A NETWORK

FIELD OF THE INVENTION

The present invention relates to computer systems and, more specifically, to simultaneous receiving and transmitting of data over a network.

BACKGROUND

A storage system is a processing system adapted to store and retrieve information/data on storage devices, such as disks. The storage system includes a storage operating system that implements a file system to logically organize the information as a hierarchical structure of directories and files on the disks. Each "on-disk" file may be implemented as a set of disk blocks configured to store information, such as text, whereas each directory may be implemented as a specially-formatted file in which information about other files and directories are stored.

The storage operating system generally refers to the computer-executable code operable on a storage system that manages data access and access requests and may implement file system semantics in implementations involving storage systems. In this sense, the Data ONTAP® storage operating system, available from Network Appliance, Inc. of Sunnyvale, Calif., which implements a Write Anywhere File Layout (WAFL®) file system, is an example of such a storage operating system implemented as a microkernel within an overall protocol stack and associated disk storage. The storage operating system can also be implemented as an application program operating over a general-purpose operating system, such as UNIX® or Windows®, or as a general-purpose operating system with configurable functionality, which is configured for storage applications as described herein.

A storage system's disk storage is typically implemented as one or more storage volumes that comprise physical storage disks, defining an overall logical arrangement of storage space. Available storage system implementations can serve a large number of discrete volumes such as 150 or more, for example. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace. As used herein, a volume is said to be "in use" when it is loaded in a storage system's memory and at least one user, application, etc., has mounted the volume and modified its contents.

A storage system may be configured to allow client systems to access files stored on a storage system. In this model, the client may comprise an application executing on a computer that "connects" to the storage system over a computer network, such as a point-to-point link, shared local area network (LAN), wide area network (WAN), or virtual private network. (VPN) implemented over a public network such as the Internet. Communications between the storage system and its clients are typically embodied as packets sent over the computer network. Each client may request the services of the storage system by issuing file-system protocol messages formatted in accordance with a conventional file-system protocol, such as the Common Internet File System (CIFS), Network File System (NITS) protocol, Fibre Channel Protocol (FCP), Internet Small Computer System Interface (iSCSI), or Storage Area Network (SAN) access.

In general, a computer system (e.g., storage system or client) may receive and transmit data over a network by implementing one or more network devices/cards operated by a device driver residing and executing on the operating system of the computer system. Although network devices may be hardware capable of full duplex operation (i.e., hardware designed to provide simultaneous receiving and transmitting of data), network devices are not conventionally implemented in software (through the operating system and the device driver) to provide full duplex capabilities. As such, there is a need for a software implementation of network devices that provide full duplex operation of the network devices to operate the network devices to their fullest capacities and to increase network data throughput.

SUMMARY

Embodiments described herein provide full duplex operation (i.e., simultaneous receiving and transmitting of data over a network) of one or more network devices of a computer system. For each network device, an operating system of the computer system typically defines a receiving process/thread for receiving data over the network and one or more transmitting processes/threads for transmitting data over the network through the network device. A device driver of the operating system controls and operates one or more network devices and, for each network device, provides and maintains an associated data structure. A receiving or transmitting thread requires access/use of the data structure associated with a network device to receive or transmit data using the network device.

Conventionally, the data structure is "locked" once a first thread accesses/uses the data structure to receive or transmit data so that no other threads may access/use the data structure. Conventionally, locking of the data structure (to only allow access of the data structure to one thread) is provided as a protection against information inconsistencies in the data structure (e.g., as caused by one thread reading information while another thread is overwriting the same information). As a result of this locking feature, at any given time, only one thread may receive or transmit data through the network device. As such, a network device that is hardware capable of full duplex operation is not conventionally operated in full duplex mode by the operating system and the device driver due to the locking of the data structure associated with the network device.

In embodiments described herein, a network device that is hardware capable of full duplex operation is operated in full duplex mode to simultaneously receive and transmit data over a network. In some embodiments, the locking feature of a data structure associated with a network device is removed in the operating system and device driver to allow a receiving thread and a transmitting thread to simultaneously access the data structure, and thus to simultaneously receive and transmit data through the network device. By operating network devices in full duplex operation, the network devices may be operated to their fullest capacities and network data throughput may be increased.

Unlocking a data structure associated with a network device to operate the network device in full duplex operation, however, may cause information inconsistencies in the data structure (e.g., as caused by one thread reading information while another thread is overwriting the same information). In some embodiments, protections against information inconsistencies in the data structure during full duplex operation are provided. In some embodiments, a data structure for a network device may be divided into a first section ("receiving information section") for exclusive use by the receiving thread and a second section ("transmitting information section") for exclusive use by a transmitting thread. For example, the first section may comprise a first continuous range of addresses in a memory of the computer system and a second section comprising a second continuous range of addresses in the memory, the first and second sections comprising non-overlapping sub-sections of the data structure. In these embodiments, the receiving thread accesses/uses only the first section and the transmitting thread accesses/uses only the second section in the data structure. By providing separate sections of the data structure for the receiving and transmitting threads to use, information inconsistencies in the data structure caused by the receiving and transmitting threads simultaneously accessing the data structure may be mitigated.

By having a receiving thread and a transmitting thread reading and writing to different sections of the data structure (as discussed above), "locking" of the data structure is no longer needed assuming a single receiving thread and a single transmitting thread are implemented. However, other protections may need to be implemented to prevent two receiving threads from simultaneously accessing the data structure and/or two transmitting threads from simultaneously accessing the data structure (which would cause information inconsistencies since two threads may be accessing the same information in the data structure at the same time). The operating system typically defines and produces a single receiving thread for receiving data using the network device. As such, two receiving threads will typically not simultaneously access the data structure associated with the network device and protections for preventing such are typically not required. A computer system may, however, concurrently execute several applications, each application requesting data to be sent over the network. As such, the operating system typically defines and produces multiple transmitting threads for a single network device. Therefore, two transmitting threads may simultaneously access the same section of the data structure associated with the network device, thereby causing information inconsistencies in the data structure.

In some embodiments, protections to prevent two transmitting threads from concurrently accessing the data structure are provided. In some embodiments, a storage queue is implemented in the operating system, the storage queue for storing data packets to be transmitted. The storage queue may be implemented in a particular software layer above the device driver layer (where the data structure is implemented). In these embodiments, the transmitting threads are configured such that a first transmitting thread that first arrives at the particular software layer is permitted access to the data structure (at the device driver layer) to operate the network device to transmit its assigned data packet. Any later transmitting threads arriving at the particular software layer store their assigned data packets to the storage queue. The later transmitting threads are then repeatedly assigned new packets to transmit, which are then repeatedly stored to the storage queue. After the first transmitting thread completes transmission of its assigned packet in the device driver layer, it repeatedly returns to the storage queue and is repeatedly assigned to transmit data packets stored in the storage queue.

In this manner, only the first arriving transmitting thread accesses the data structure at the device driver layer and the later arriving transmitting threads store their assigned data packets to the storage queue, the stored data packets being later assigned to the first transmitting thread to complete their transmission. As such, two transmitting threads are prevented from concurrently accessing the data structure and information inconsistencies in the data structure may be mitigated. In addition, by allowing later arriving transmitting threads to store their assigned data packets to a storage queue and return to be assigned new data to process, the later arriving transmitting threads are continually processing data to be transmitted rather than waiting for a transmitting thread currently accessing the data structure to complete transmission. As such, down time of transmitting threads may be reduced and data transmission performance further increased.

In some embodiments, protection at the device driver layer is implemented to prevent two transmitting threads from concurrently accessing the data structure. For example, a locking utility module of the operating system and the device driver may be configured to work in conjunction to provide a transmitting thread locking feature. The device driver may be configured so that the data structure is used to store information regarding which transmitting thread currently has access to the data structure at any given time (referred to as the transmitting thread "having the lock"). The locking utility module may be configured so that it allows access to the data structure by only the one transmitting thread "having the lock" (and prevent other transmitting threads from accessing the data structure).

As discussed above, some embodiments removing the locking feature of the data structure of a network device and provide protections against information inconsistencies in the data structure to allow full duplex operation of the network device. As such, the full bandwidth capability of network devices that are hardware capable of full duplex operation may be realized and overall network data throughput may be increased. Network data transfer rates are an important performance factor for all devices that operate on a network. Network data transfer rates are especially important to server and storage systems implementing a network to transfer and store data.

DETAILED DESCRIPTION

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I describes a storage system environment in which some embodiments operate. Section II describes operations of a network device and receiving and transmitting threads. Section III describes methods and apparatus for providing full duplex operation of a network device.

Embodiments described herein provide full duplex operation (i.e., simultaneous receiving and transmitting of data over a network) of one or more network devices of a computer system. For each network device, an operating system of the computer system typically defines a receiving process/thread for receiving data over the network and one or more transmitting processes/threads for transmitting data over the network through the network device. A device driver of the operating system controls and operates one or more network devices and, for each network device, provides and maintains an associated data structure. A receiving or transmitting thread requires access/use of the data structure associated with a network device to receive or transmit data using the network device.

Conventionally, the data structure is "locked" once a first thread accesses/uses the data structure to receive or transmit data so that no other threads may access/use the data structure. As a result of this locking feature, at any given time, only one thread may receive or transmit data through the network device. As such, a network device that is hardware capable of full duplex operation is not conventionally operated in full duplex mode by the operating system and the device driver due to the locking of the data structure associated with the network device. In embodiments described herein, a network device that is hardware capable of full duplex operation is operated in full duplex mode to simultaneously receive and transmit data over a network. In some embodiments, the locking feature of a data structure associated with a network device is removed in the operating system and device driver to allow a receiving thread and a transmitting thread to simultaneously access the data structure, and thus to simultaneously receive and transmit data through the network device. By operating network devices in full duplex operation, the network devices may be operated to their fullest capacities and network data throughput may be increased.

I. Storage System Environment

Figure 1:
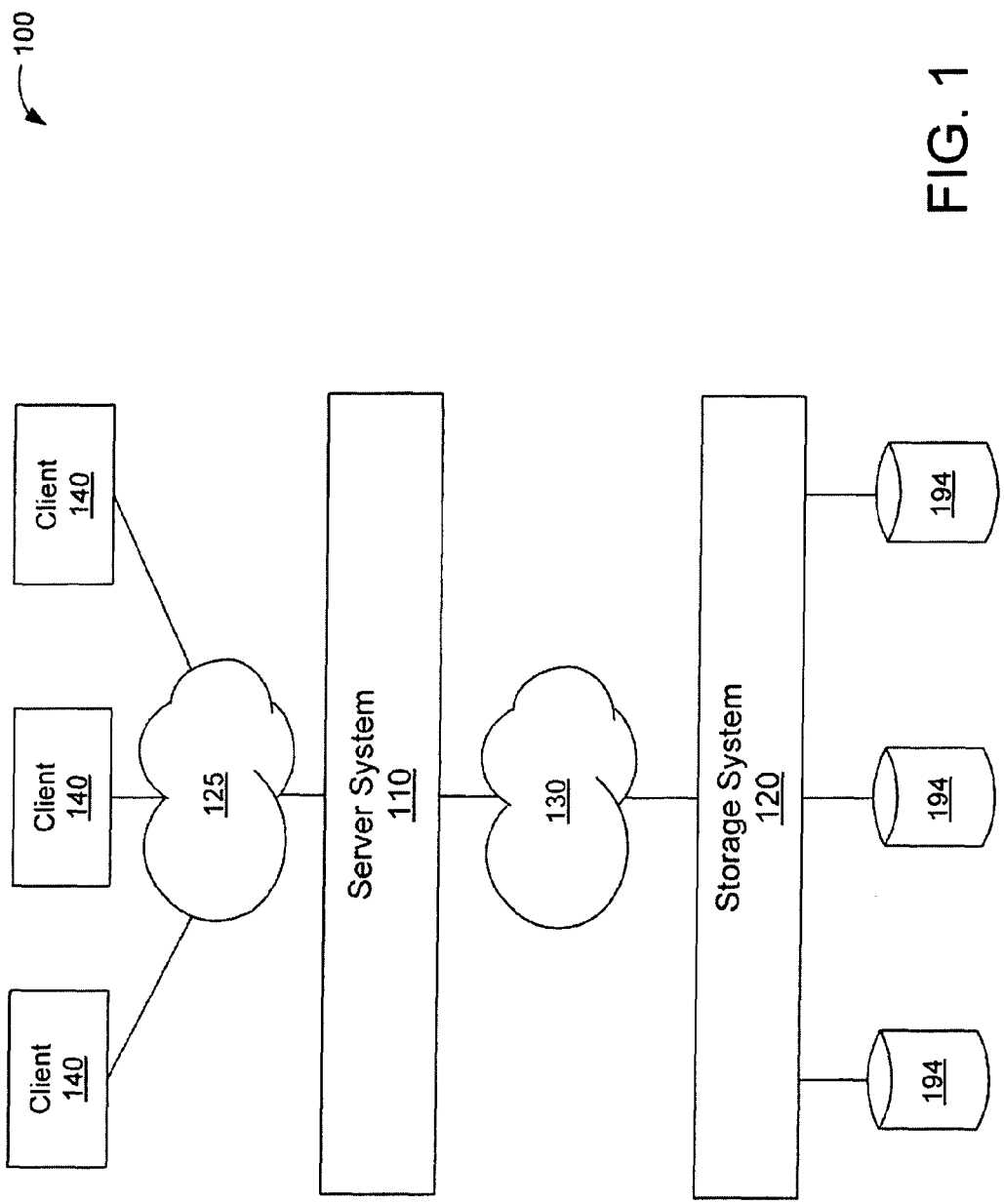
FIG. 1 is a schematic block diagram of an exemplary storage system environment in which some embodiments operate.

FIG. 1 is a block diagram of an exemplary storage system environment 100 in which some embodiments operate. The environment 100 comprises a server system 110 connected to multiple client systems 140 via a network 125. The environment 100 further comprises a storage system 120 having a set of mass storage devices 194 providing a set of storage volumes connected to the server system 110 via a network 130.

The server system 110 is a computer that handles requests for data, electronic mail, file transfers, or other network services from client systems 140. The server system 110 can be connected to clients 140 over the network 125, such as a Local Area Network (LAN), Wide Area Network (WAN), or the like. The server system 110 may execute applications including applications that require receiving or transmitting data (using a network device) to various clients 140 over the network 125. Likewise, the various clients 140 may execute applications that require receiving or transmitting data (using a network device) to the server system 100 over the network 125.

The server system 110 utilizes services of the storage system 120 to store and manage information in a set of mass storage devices 194. Interaction between the server system 110 and the storage system 120 can enable the provision of storage services. That is, the server system 110 may request the services of the storage system 120, and the storage system 120 may return the results of the services requested by the server system 110, by exchanging data packets over the network 130. The server system 110 may execute applications that require receiving or transmitting data to the storage system 120 over the network 130. The storage system 120 may respond to requests of the server system 110 by receiving or transmitting data (using a network device) to the server system 110 over the network 130.

The server system 110 may issue packets using file-based access protocols, such as the Common Internet File System (CIFS) protocol or Network File System (NFS) protocol, over the Transmission Control Protocol/Internet Protocol (TCP/IP), when accessing information in the form of files and directories. Alternatively, the server system 110 may issue packets including block-based access protocols, such as the Small Computer Systems Interface (SCSI) protocol encapsulated over TCP (iSCSI) and SCSI encapsulated over Fibre Channel (PCP), when accessing information in the form of blocks. The storage system 120 may be coupled locally to the server system 110 over the network 130, such as a local area network (LAN), a wide area network (WAN), metropolitan are network (MAN), or the Internet.

As described herein, the storage system 120 stores data in a set of mass storage devices 194, preferably on one or more writable storage device media such as magnetic disks, video tape, optical, DVD, magnetic tape, and any other similar media adapted to store information, including data and parity information. For illustrative purposes, however, as described herein, the data is stored on disks 194. The disks 194 within a volume are typically organized as one or more groups of Redundant Array of Independent (or Inexpensive) Disks (RAID). The server system 110 utilizes services of the storage system 120 to store and manage data in a set of mass disks 194 that provide a set of storage volumes. As known in the art, a disk 194 may have one or more storage volumes, where each volume has a file system implemented on the volume. A file system implemented on the disks 194 may provide multiple directories in a single volume, each directory containing zero or more filenames. A file system provides a logical/virtual representation of how data (files) are organized on a volume, where data (files) are represented as filenames that are organized in one or more directories. Examples of common file systems include New Technology File System (NTFS), File Allocation Table (FAT), Hierarchical File System (HFS), Universal Disk Format (UDF), UNIX® file system, and the like.

Figure 2:
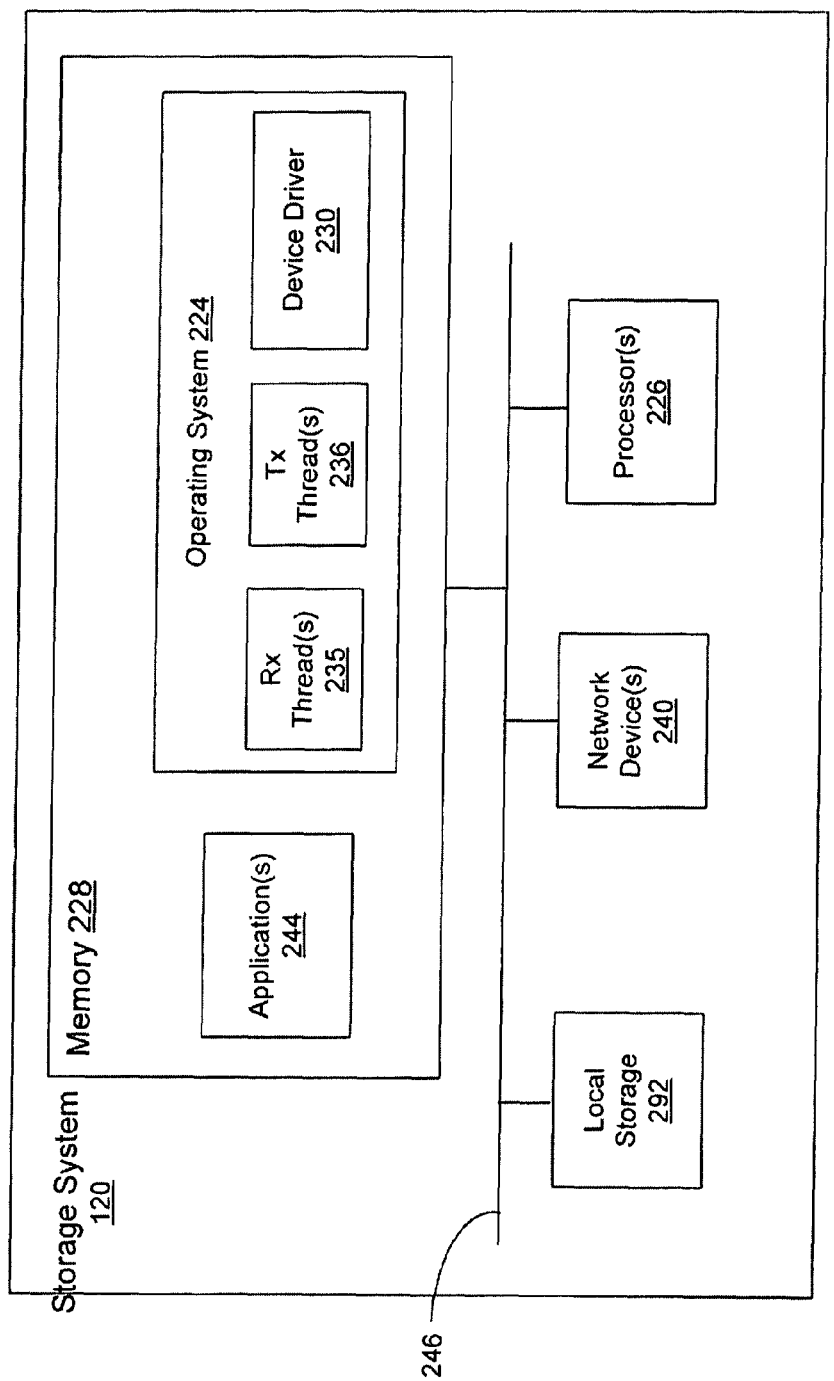
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Although a storage system 120 is described in the embodiments below, those skilled in the art will understand that the embodiments herein may apply to any type of computer system, such as a special-purpose computer (e.g., file serving appliance) or general-purpose computer, including a standalone computer, embodied or not embodied as a storage system. The storage system 120 comprises processor(s) 226, memory 228, one or more network devices/adapters 240, and a local storage 292 coupled by a bus 246.

The processors 226 comprise the central processing units (CPUs) of the storage system 120 and control the overall operation of the storage system 120. In certain embodiments, the processors 226 accomplish this by executing software, such as software described below. The processors 226 may include one or more programmable general-purpose or special-purpose microprocessors, digital signal processors (DSPs), programmable controllers, application specific integrated circuits (ASICs), programmable logic devices (PLDs), or the like, and/or a combination of such devices.

The memory 228 comprises storage locations that are addressable by the processor 226 and adapters, such as a network device/adapter 240. The memory 228 may be a random access memory (RAM), a read-only memory (ROM), or the like, or a combination of such devices. It will be apparent to those skilled in the art that other processing and memory means, including various computer readable media, may be used for storing and executing program instructions pertaining to embodiments described herein. The storage locations in memory 228 may comprise data structures, buffers, and/or storage queues for implementing receiving or transmitting threads for receiving or transmitting data as described herein. The memory 228 may store software program code, such as one or more applications 244 that receive or transmit data (using a network device 240) over a network.

The memory 228 may also store software program code such as an operating system 224. The operating system 224 is a program that, after being initially loaded into the memory 228, manages applications 244 executing on the storage system 120. The operating system 224 can be, for example, UNIX®, Windows NT®, Linux®, Data ONTAP®, or another operating system. The operating system 224 also defines and produces one or more receiving threads 235 for receiving data and one or more transmitting threads 236 for transmitting data over a network using a network device 240. A thread may comprise a predetermined process defined by the operating system 224 and executed by a processor 226.

The operating system 224 also includes device driver software 230 for controlling and operating one or more network devices 240 to receive or transmit data. The processor 226 and the network devices 240 may, in turn, comprise processing elements and/or logic circuitry configured to execute the software code stored in memory 228 and manipulate various addressable storage locations (such as in data structures, buffers, and/or storage queues) in memory 228.

A network device 240 may comprise mechanical, electrical and signaling circuitry needed to connect the storage system 120 to the network and, to receive and transmit data over the network. Network devices 240 are discussed in greater detail below in relation to FIG. 3. The local storage 292 is a device that stores software code and information within the storage system 120, such as the applications 244, the operating system 224, and associated data. The storage system 120 loads the software and information into the memory 228 from which they are accessed by the processors 226.

II. Network Device for Receiving and Transmitting Data

Figure 3:
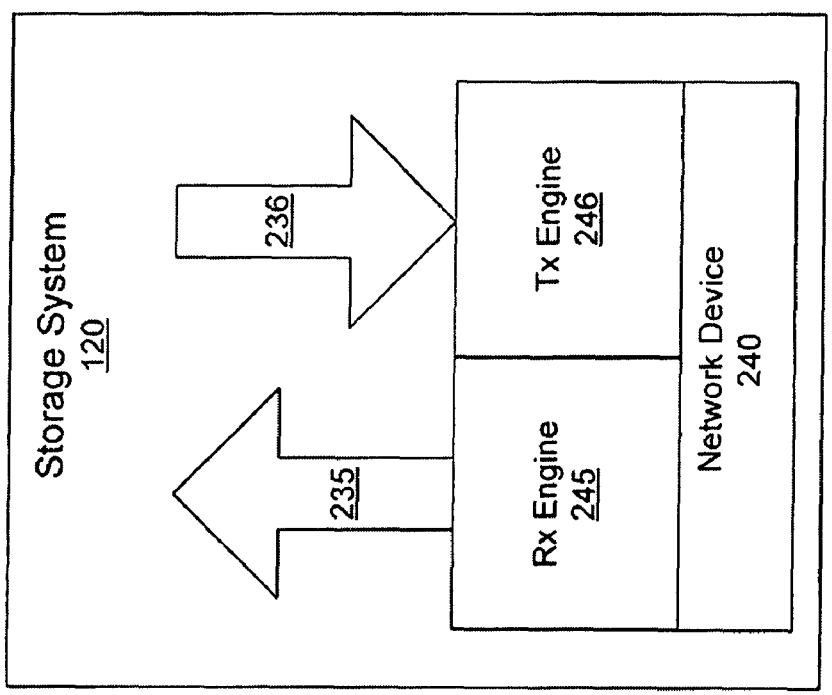
FIG. 3 is a conceptual diagram of the relationship between receiving and transmitting threads and a network device of a storage system.

FIG. 3 is a conceptual diagram of the relationship between receiving and transmitting threads and a network device 240 of a storage system 120. A network device 240 comprises a receiving engine hardware 245 for receiving data (as network formatted packets of data) and a transmitting engine hardware 246 for transmitting data (as network formatted packets of data). In some embodiments, the network device 240 comprises a receiving engine 245 and transmitting engine 246 that are hardware capable of operating in full duplex mode. The network device 240 may comprise a network interface controller (e.g., Ethernet cards), network adapter, or any other physical device that controls the receiving and transmitting of data over a network. A network device 240 may provide one or more data access ports for coupling the storage system 120 to one or more other computer systems through a network (such as point-to-point links, wide area networks, virtual private networks implemented over a public network (Internet), a shared local area network, etc.). A network device 240 thus may comprise the mechanical, electrical and signaling circuitry needed to connect the storage system 120 to the network.

Via the network, the network device 240 may receive data in the form of data packets formatted to allow proper transport over the network according to a particular communication protocol format (such as Transport Control Protocol (TCP), Internet Protocol (IP), Hyper Text Transfer Protocol (HTTP), etc.). Each data access port Of the network device 240 has a unique port number and is typically assigned to receive data packets having a particular protocol format (e.g., port 80 is typically dedicated for packets in the HTTP format). Upon receiving an initial data packet from an external computer system over the network, a connection and session with the external computer system may be established using a data port of the network device 240 to receive further data packets. Once a data packet is received by the network device 240, the operating system 224 of the storage system 120 assigns a receiving thread 235 to process the received data packet (e.g., to remove protocol formatting applied to the data packet to produce data useable by an application 244). The operating system 224 typically produces and makes available only a single receiving thread 235 for each network device 240.

When an application 244 executing on the storage system 120 has data to send over the network to the external computer, the operating system 224 assigns a transmitting thread 236 to process the data (e.g., ready the data for transmission by adding protocol formatting) and transmit the data using the network device 240. Since several applications 244 executing on the storage system 120 may request to transmit data at the same time, the operating system 224 typically produces and makes available multiple transmitting threads 236 for each network device 240.

Figure 4:
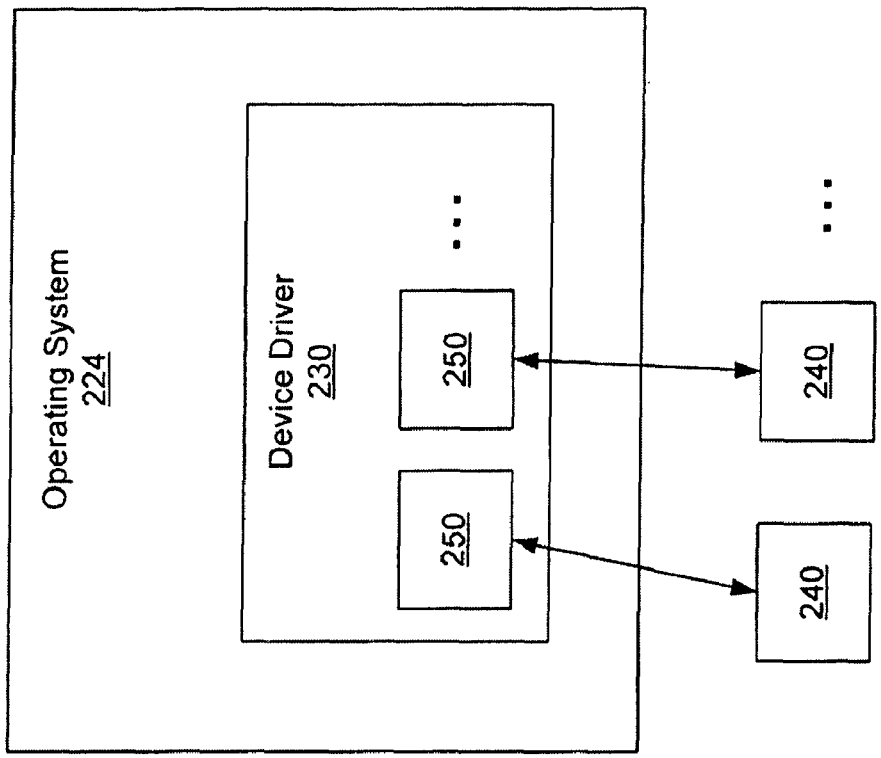
FIG. 4 shows a conceptual diagram of an operating system comprising a device driver for controlling and operating one or more network devices.

FIG. 4 shows a conceptual diagram of an operating system 224 comprising a device driver 230 for controlling and operating one or more network devices 240. For each network device 240 under the control of the device driver 230, the device driver 230 provides and maintains an associated data structure 250 for use by receiving and transmitting threads currently using the network device 240 to receive or transmit data. A data structure 250 may comprise an area in the memory 228 of the storage system 120. The data structure 250 associated with a network device 240 may contain information regarding the network device 240 (e.g., identifier of the network device 240, pointers to data buffers that the network device 240 uses for storing receiving or transmitting data, status information of network device 240, etc.).

The receiving thread may also store to and read from the data structure information (referred to as "receiving information") needed to properly receive data through the network device 240 (e.g., the number of data packets received, buffer address locations of the received data packets, size of each data packet received, etc.). The transmitting thread may store to and read from the data structure information (referred to as "transmitting information") needed to properly transmit data through the network device 240 (e.g., the number of data packets transmitted, buffer address locations of where data to be transmitted begins and ends, etc.). Note that the terms "receiving information" and "transmitting information" relate to information needed to receive and transmit data using the network device 240, and do not relate to the actual data received over a network or the data to be transmitted over a network.

As such, a thread must have access and control of the data structure 250 associated with a network device 240 in order to access and control the network device 240 to receive or transmit data. Conventionally, the data structure is "locked" once a first thread accesses/uses the data structure to receive or transmit data so that no other threads may access/use the data structure. Hence other later threads are "locked out" from accessing the data structure and must wait until the first thread is done using the data structure and the data structure is released/unlocked (at which point the next thread in line may access the data structure). Typically, a locking utility module of the operating system 224 works in conjunction with the data structure to provide the locking feature. The data structure is used to store information regarding which thread currently has access to the data structure at any given time (referred to as the thread "having the lock") and the locking utility module may only access to the data structure by the thread "having the lock" (and prevent other threads from accessing the data structure).

Conventionally, locking of the data structure (to only allow access of the data structure to one thread) is provided as a protection against information inconsistencies in the data structure (e.g., as caused by one thread reading information while another thread is overwriting the same information). As such, at any given time, only one thread may access the data structure and thus only one thread may receive or transmit data using the network device at any given time. Therefore, a network device that is hardware capable of full duplex operation is not conventionally operated in full duplex mode by the operating system and the device driver due to the locking of the data structure associated with the network device. In embodiments described below, a network device (that is hardware capable of full duplex operation) is operated in full duplex mode (to simultaneously receive and transmit data over a network) by removing the locking feature of the data structure and providing protections against information inconsistencies in the data structure.

Figure 5:
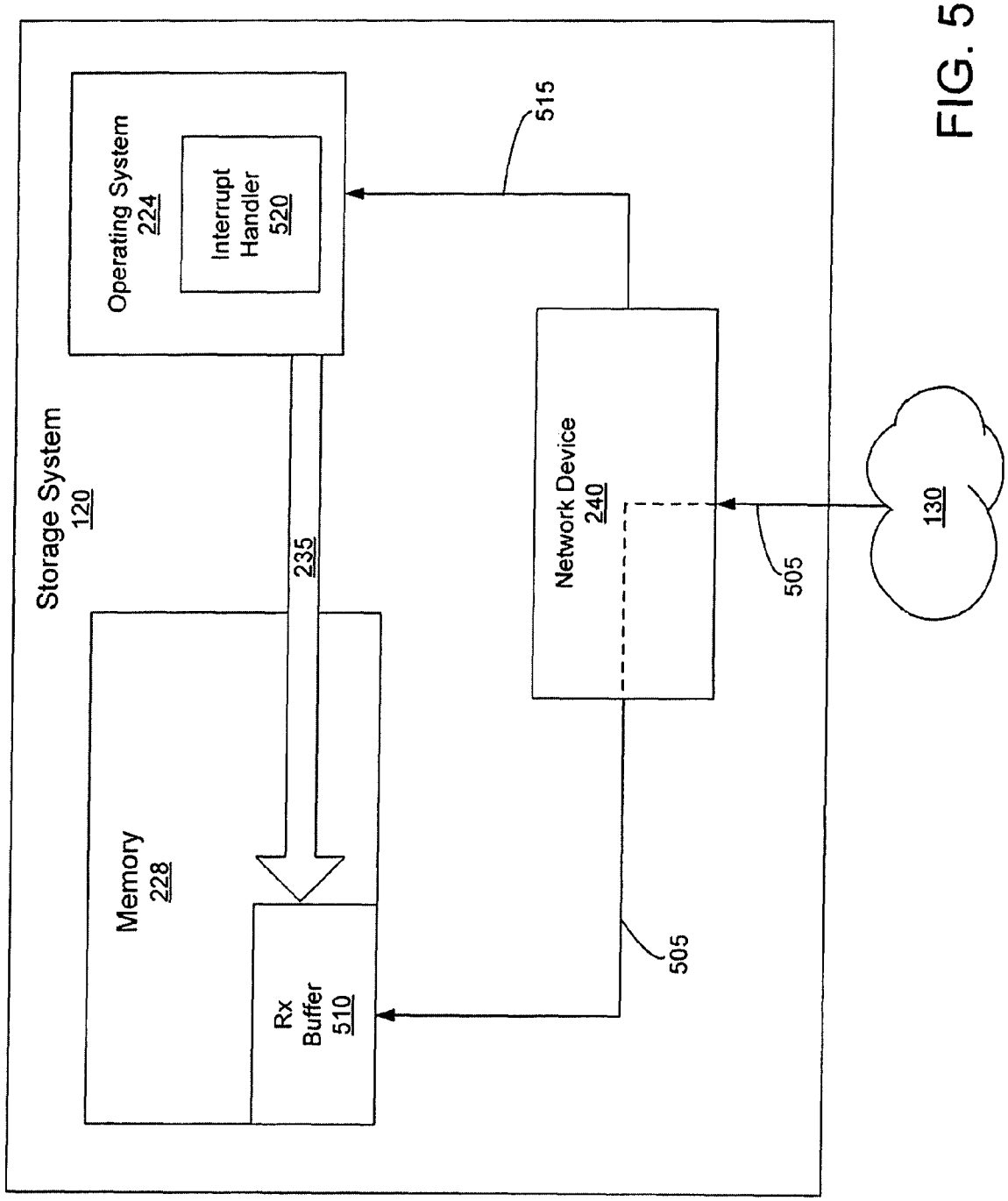
FIG. 5 shows a conceptual diagram of an overall receiving process implemented on a storage system in some embodiments.

FIG. 5 shows a conceptual diagram of an overall receiving process implemented on a storage system 120 in some embodiments. FIG. 5 illustrates a direct memory access scheme for receiving data. In other embodiments, however, other methods of receiving technologies may be used.

As shown in FIG. 5, data 505 (in the form of network formatted packets) are received from a network 130 by the network device 240. The network device 240 then stores the received data to a receiving buffer 510 in memory 228. The receiving buffer 510 may be a buffer (comprising a particular address range in memory 228) previously allocated to the network device 240 by the processor 226 for storing received data. After the network device 240 completes storing all received data 505 to the receiving buffer 510, the network device 240 sends an interrupt signal 515 to the operating system 224 indicating to the processor 226 that there is received data ready for processing. The interrupt signal 515 is responded to by an interrupt handler module 520 in the operating system 224 that disables interrupt signals for the network device 240 and calls and assigns a receiving thread 235 to each received interrupt signal 515.

Figure 6:
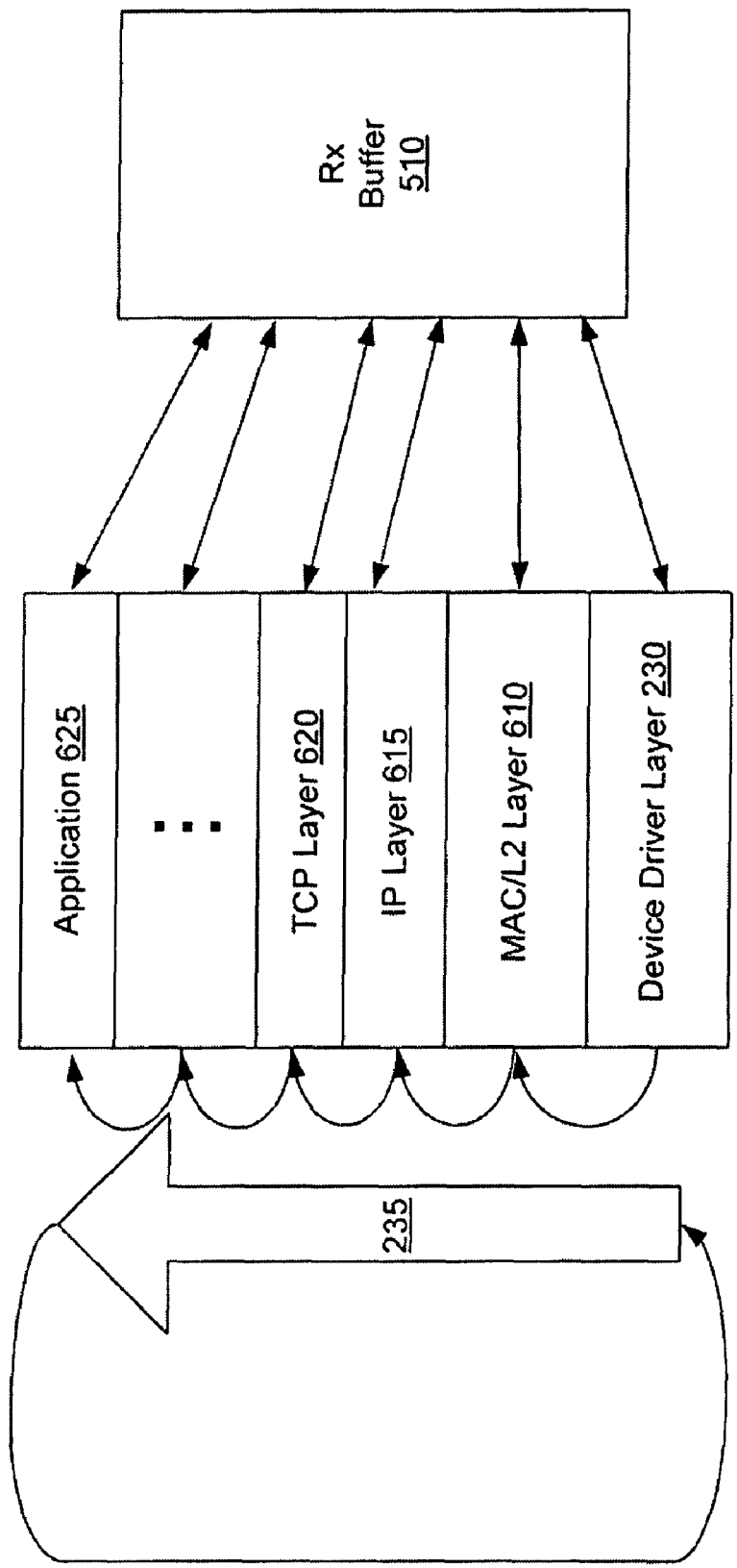
FIG. 6 shows a conceptual diagram of the operations of a receiving thread performed on a received data packet stored in the receiving buffer.

The receiving thread 235 then processes the received data stored in the receiving buffer 510. FIG. 6 shows a conceptual diagram of the operations of a receiving thread 235 performed on a received data packet stored in the receiving buffer 510. The receiving thread 235 may manage and oversee processing of a received data packet by various software layers of the operating system 224 that work together to remove network packet formatting of the data packet to produce data useable to an application 625 receiving the data. Examples of software layers of the operating system 224 include the device driver layer 230, a media access control (MAC/L2) layer 610, Internet Protocol (IP) layer 615, and a transport layer 620 (e.g., TCP protocol). The exemplary software layers shown in FIG. 6 are for illustrative purposes only, and in other embodiments, the operating system 224 may comprise other software layers. The various software layers of the operating system 224 are sometimes referred to as a network protocol stack.

Each software layer may remove a respective layer of network formatting from the data packet (e.g., the IP layer 615 may remove IP protocol formatting from the data packet, etc.). The receiving thread 235 may call the device driver layer 230 which processes the data packet accordingly. When the device driver layer is finished, it may call the next software layer (e.g., MAC layer 610) to process the data packet, which calls the next software layer, and so on until useable data is produced and delivered to the application 625. Typically, each software layer processes data in the receiving buffer 510 and stores the processed data back into the receiving buffer 510 for the next software layer to process. As such, the receiving thread 235 implements the various software layers to process the received data, where the software layers are executed in the context of the receiving thread 235.

When processing the data packet in the receiving buffer 510, the device driver 230/receiving thread 235 may access a data structure (associated with the network device 240 that received the data packet) to store and/or read receiving information. Such receiving information may include, for example, a number of data packets received, a status word for holding the interrupt status, a pointer to memory address locations of the received data packets, a pointer to a next buffer with received data packets (when the receiving buffer is organized as a ring buffer), etc. Conventionally, upon accessing the data structure, the device driver 230 locks the data structure so that other threads may not access the data structure until the receiving thread 235 is finished using the data structure. The MAC layer 610 acts as an interface between the device driver 230 and the protocol layers (such as IP layer 615 and TCP layer 620). The IP layer 615 may remove IP protocol formatting from the data packet and the TCP layer 620 may remove the TCP packeting from the data packet to produce non-packetized data to be received by the application 625.

After each software layer finishes processing the data packet, the receiving thread 235 begins processing a next data packet stored in the receiving buffer 510. The above process is then repeated for each data packet until all data packets in the receiving buffer 510 are processed. After the last packet is processed, the device driver 230 may release the lock on the data structure so it may be used by other threads and re-enable the interrupt signals for the network device 240. Also, the receiving thread 235 may become dormant and wait until it is assigned to a next interrupt signal 515 by the interrupt handler 520.

Figure 7:
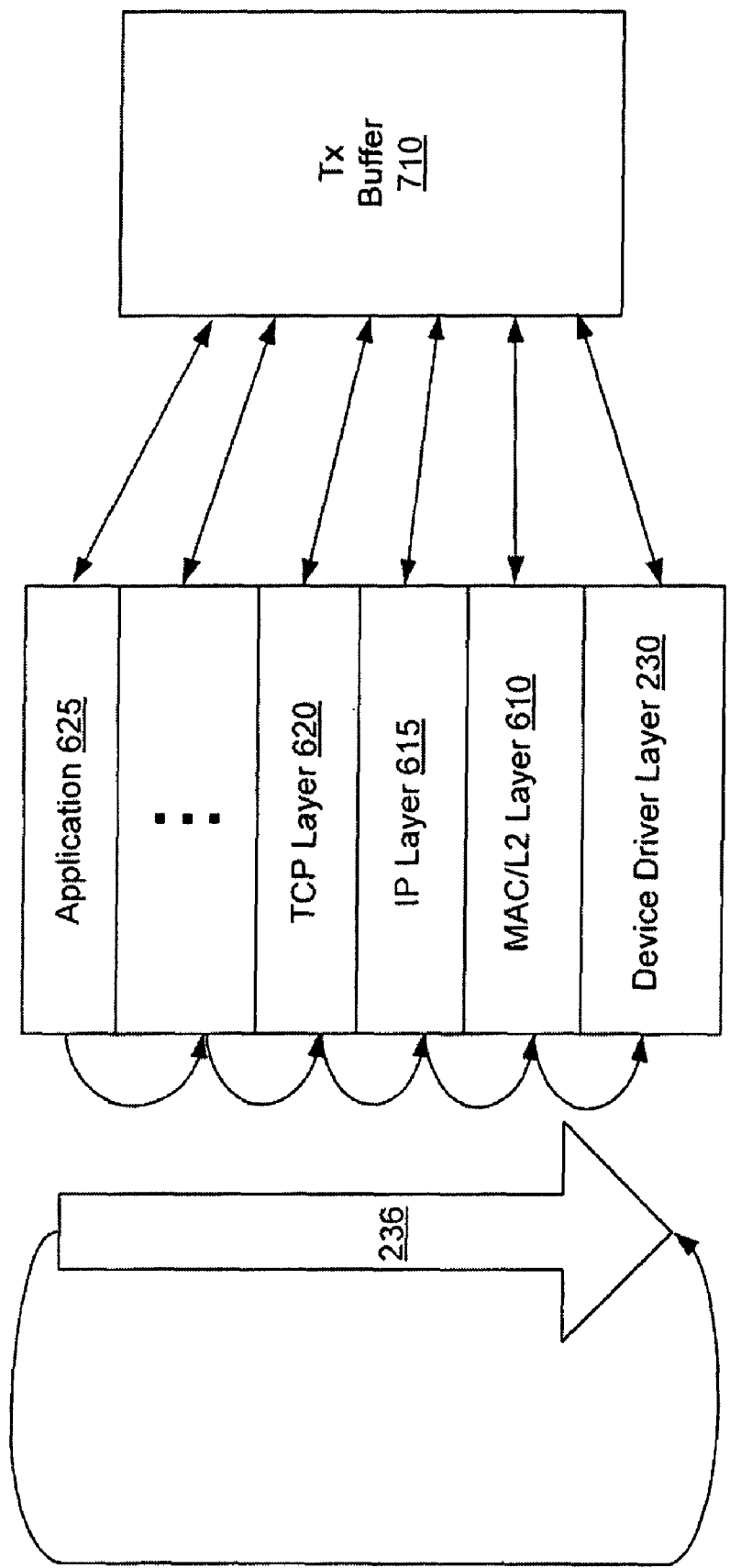
FIG. 7 shows a conceptual diagram of the operations of a transmitting thread performed on a data to be transmitted.

On the transmitting side, the application 625 may produce data requiring transmission over the network. The operating system 224 may assign a transmitting thread 236 to ready the data for transmission and transmit the data through the network device 240. FIG. 7 shows a conceptual diagram of the operations of a transmitting thread 236 performed on a data to be transmitted. The application 625 may store the data to be transmitted to a transmitting buffer 710 contained in memory 228. The transmitting thread 236 may then manage and oversee processing of the data stored in the transmitting buffer 710 by various software layers of the operating system 224. The various software layers work together to apply network packet formatting of the data to produce transportable data packets. The exemplary software layers shown in FIG. 6 are for illustrative purposes only, and in other embodiments, the operating system 224 may comprise other software layers.

The transmitting thread 236 may call the first software layer (e.g., TCP layer 620) to begin processing the data in the transmitting buffer 710 and give a pointer to the data (e.g., a starting location/address in memory 228 and size of data to be sent). Each software layer may add a respective layer of network formatting to the data. When each layer is finished processing the data, it may call the next software layer to process the data and so on until properly formatted data packets are ready to be sent over the network by the device driver 230 and network device 240. For example, the TCP layer 620 may format the data into packets and then calls the IP layer 615 which applies routing information to the packets according to the IP protocol, etc.

Typically, each software layer processes data in the transmitting buffer 710 and stores the processed data back into the transmitting buffer 710 for the next software layer to process (and passes a pointer to the data to the next software layer). As such, the transmitting thread 236 implements the various software layers to process the data to be transmitted, where the software layers are executed in the context of the transmitting thread 236. When the last software layer (e.g., MAC layer 610) above the device driver layer 230 finishes processing the data to be sent, the layer calls the device driver 230 and passes the pointer to the data in transmitting buffer 710 to the device driver 230 (which in turn passes the pointer to the network device 24. The device driver 230 typically does not reformat or modify the data in transmitting buffer 710 but simply transmits the data using the network device 240.

When transmitting the formatted data packets stored in the transmitting buffer 710, the device driver 230/transmitting thread 236 may access a data structure (associated with the network device 240 that will send the data packets) to store and/or read transmitting information. Such transmitting information may include, for example, a number of data packets to be transmitted, a pointer to a next buffer location with data packets to be transmitted (when the transmitting buffer is organized as a ring buffer), an index into the ring buffer indicating the last buffer location that completed transmission and was since freed by the operating system 224, an index into the ring buffer indicating the last buffer location that has been transmitted by the network device 240 and can be freed by the operating system 224, etc. Conventionally, upon accessing the data structure, the device driver 230 locks the data structure so that other threads may not access the data structure until the transmitting thread 236 is finished using the data structure. Although there may be a plurality of transmitting threads 236 assigned by the operating system 224 to transmit data from one or more applications 625 using the same network device 240, the locking feature of the data structure only allows one transmitting thread 236 to access the data structure 250 and thus operate the device driver 240 at any given time.

The network device 240 then directly accesses the transmitting buffer 710 to retrieve data packets using pointers to the data packets and then sends the data packets over the network. If more data is to be sent, the transmitting thread 236 begins processing a next set of data produced by the application 625 and stored to the transmitting buffer 710. The above process is then repeated for the next set of data to be sent, over the network. If no more data is to be sent and all the data in the transmission buffer 710 has been transmitted, the device driver 230 may release the lock on the data structure so it may be used by other threads and the transmitting thread 236 may become dormant and wait until it is assigned to a next set of data to be transmitted.

Figure 8:
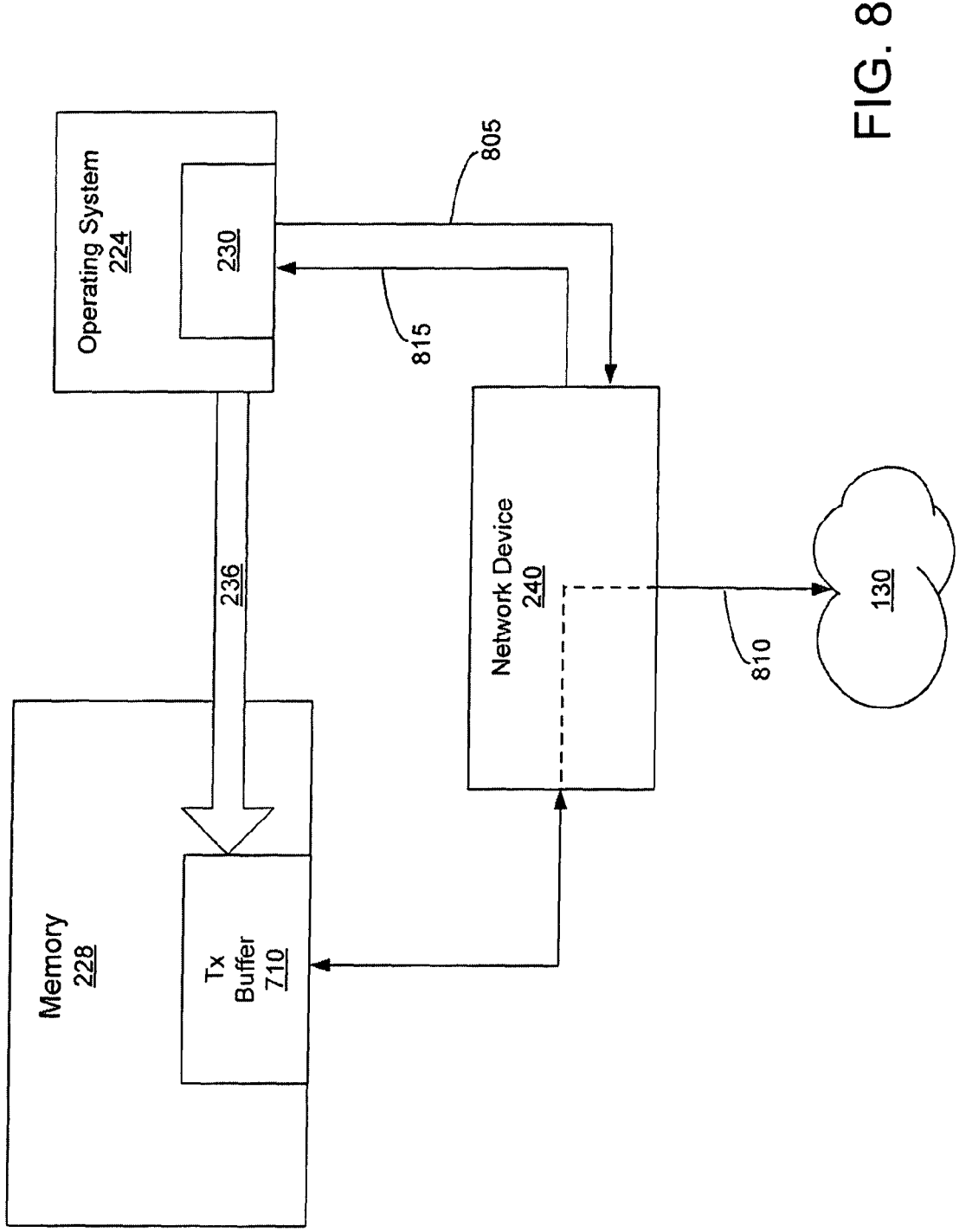
FIG. 8 shows a conceptual diagram of an overall transmitting process implemented on a storage system in some embodiments.

FIG. 8 shows a conceptual diagram of an overall transmitting process implemented on a storage system 120 in some embodiments. In FIG. 8, a transmitting thread 236 has been assigned to transmit data produced by an application, the data to be transmitted being stored to a transmitting buffer 710 in memory 228. The transmitting thread 236 has processed the data (by implementing the network software layers illustrated in FIG. 7) to produce network formatted packets that are ready for transmission over a network 130. The device driver 230 and network device 240 may now be used to transmit the data.

At this point, the device driver 230 sends a pointer 805 to the network device 240, the pointer 805 indicating the location in memory 228 of data packets that are ready for transmission. When transmitting the formatted data packets, the device driver 230/transmitting thread 236 may access a data structure associated with the network device 240 to store and/or read transmitting information (as discussed above). The network device 240 directly accesses the transmitting buffer 710 to retrieve data packets using the pointers to the data packets and then sends the data packets 810 over the network 130. After the network device 240 completes sending all data packets 810 in the transmitting buffer 810, the network device 240 sends a "free buffer" signal 815 to the operating system 224 indicating that all data in the current transmitting buffer 710 has been sent. The signal 815 is responded to by the operating system 224 which frees the transmitting buffer 710 for use.

III. Providing Full Duplex Operation of a Network Device

In embodiments described herein, a network device that is hardware capable of full duplex operation is operated in full duplex mode to simultaneously receive and transmit data over a network. In some embodiments, the locking feature of a data structure associated with a network device is removed in the operating system and device driver to allow a receiving thread and a transmitting thread to simultaneously access the data structure, and thus to simultaneously receive and transmit data through the network device. For example, to remove the locking feature from a particular data structure, the data structure may be configured to not store lock information (e.g., information regarding which thread currently has access to the data structure at any given time). By operating network devices in full duplex operation, the network devices may be operated to their fullest capacities and network data throughput may be increased.

Figure 9B:
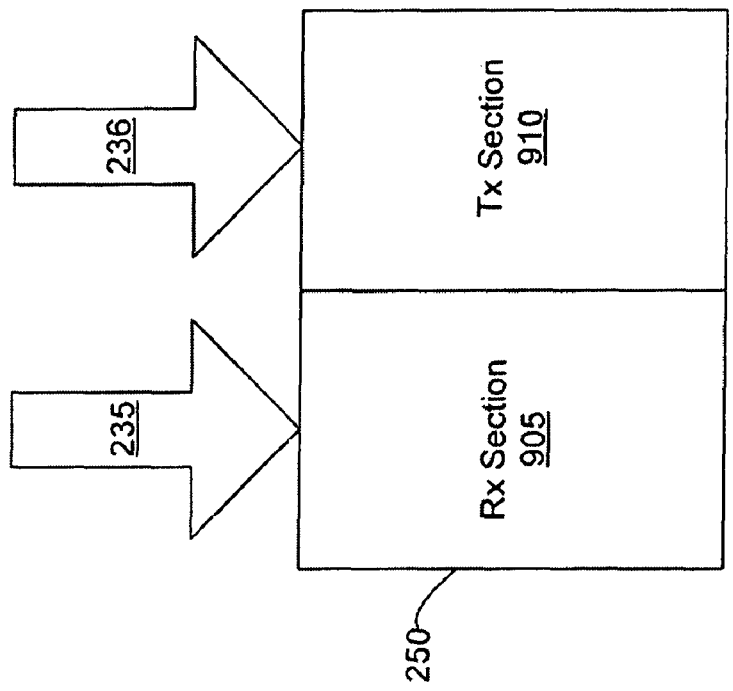
FIG. 9B shows a conceptual diagram of a data structure divided into a receiving information section and a transmitting information section.
Figure 9A:
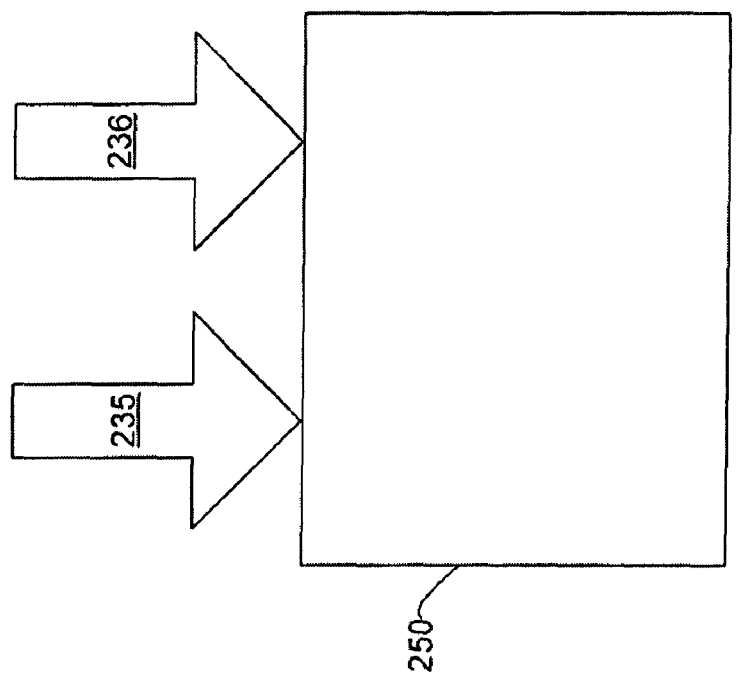
FIG. 9A shows a conceptual diagram of a data structure that stores information for a receiving thread and a transmitting thread.

In some embodiments, protections against information inconsistencies in the data structure during full duplex operation (e.g., as caused by one thread reading information while another thread is overwriting the same information in the data structure) are provided. FIG. 9A shows a conceptual diagram of a data structure 250 that stores information for a receiving thread 235 and a transmitting thread 236. The data structure may comprise a contiguous area/segment in memory 228 having a continuous range of addresses in the memory 228.

When receiving data through the network device 240 associated with the data structure 250, the receiving thread 235 may store receiving information to the data structure 250 (e.g., the number of data packets received, buffer address locations of the received packets, etc.). When transmitting data through the network device 240, the transmitting thread 236 may store transmitting information to the data structure 250 (e.g., the number of data packets received to be transmitted, buffer address locations of the packets, etc.). The data structure may store the receiving and transmitting information in the form of receiving and transmitting fields/attributes (e.g., number of data packets received or transmitted) containing values (e.g., 12). Typically, the receiving thread 235 has access to the entire data structure and stores or reads receiving information to or from any address location in the data structure. Likewise, the transmitting thread 236 typically also has access to the entire data structure and stores or reads transmitting information to or from any address location in the data structure. As such, receiving and transmitting information is typically interspersed in the data structure. Since the receiving and transmitting threads each have access to the entire data structure, there is the possibility of information inconsistencies in the data structure when both threads simultaneously access the data structure during full duplex operation (e.g., as caused by one thread reading information while another thread is overwriting the same information).

In some embodiments, a data structure for a network device may be divided into a first section ("receiving information section") for exclusive use by the receiving thread and a second section ("transmitting information section") for exclusive use by a transmitting thread. FIG. 9B shows a conceptual diagram of a data structure 250 divided into a receiving information section 905 that stores information for a receiving thread 235 and a transmitting information section 910 that stores information for a transmitting thread 236. In some embodiments, the receiving information section 905 may comprise a first continuous range of addresses in a memory of the storage system and the transmitting information section 910 may comprise a second continuous range of addresses in the memory, the sections 905 and 910 comprising non-overlapping sub-sections of the data structure. In some embodiments, the device driver 230 is configured to provide, for each network device 240 under its control, a data structure 250 having a receiving information section 905 and a transmitting information section 910 as described above.

In these embodiments, the receiving thread 235 accesses/uses only the receiving information section 905 and the transmitting thread 236 accesses/uses only the transmitting information section 910 in the data structure 250. For example, the operating system may be configured to define the receiving thread 235 so that it accesses only the receiving information section 905 and may be configured to define the transmitting thread 236 so this it accesses only the transmitting information section 910 in the data structure 250. By providing separate sections of the data structure for the receiving and transmitting threads to use, assurance is provided that the receiving thread 235 does not overwrite transmitting information and the transmitting thread 236 does not overwrite receiving information. As such, information inconsistencies in the data structure caused by the receiving and transmitting threads simultaneously accessing the data structure may be mitigated since the two threads now store to or read from separate sections of the data structure.

By having a receiving thread and a transmitting thread reading and writing to different sections of the data structure (as discussed above), "locking" of the data structure is no longer needed assuming a single receiving thread and a single transmitting thread are implemented. However, other protections may need to be implemented to prevent two receiving threads from simultaneously accessing the data structure and/or two transmitting threads from simultaneously accessing the data structure (which would cause information inconsistencies since two threads may be accessing the same information in the data structure at the same time).

The operating system typically defines and produces a single receiving thread for receiving data using the network device. As such, two receiving threads will typically not simultaneously access the data structure associated with the network device and protections for preventing such are typically not required. A storage system may, however, concurrently execute several applications, each application requesting data to be sent over the network. As such, the operating system typically defines and produces multiple transmitting threads for a single network device. Therefore, two transmitting threads may simultaneously access the data structure associated with the network device and possibly simultaneously access the same information in the data structure, thereby causing information inconsistencies in the data structure.

In some embodiments, protections to prevent two transmitting threads from concurrently accessing the data structure are provided. In some embodiments, a storage queue is implemented in the operating system, the storage queue for storing data packets to be transmitted. The storage queue may comprise a storage mechanism implemented by the operating system (e.g., in the form of a data structure or buffer in memory 228) for storing and queuing data packets. In other embodiments, the storage queue is implemented in a different manner. The storage queue may be implemented in a particular software layer "above" the device driver layer (where the data structure is used by the device driver layer to transmit data ready for transmission). As such, the transmitting thread will execute the particular software layer before executing the device driver layer (so that data to be transmitted is processed by the particular software layer before being processed by the device driver layer).

In these embodiments, the operating system is further configured to define the transmitting threads so that a first transmitting thread (assigned to a data packet to be transmitted) that first arrives at the particular software layer (i.e., is the first transmitting thread to begin execution of the particular software layer to process its assigned data) is permitted access to the data structure 250 (at the device driver layer 230) to operate the network device 240 to transmit its assigned data packet. Any later transmitting threads arriving at the particular software layer after the first arriving thread, after completing execution of the particular software layer, store their assigned data packets to the storage queue. The later transmitting threads are then repeatedly assigned new data to transmit for various applications, which are then repeatedly stored to the storage queue. After the first arriving transmitting thread completes transmission of its assigned packet in the device driver layer, it repeatedly returns to the software layer having the storage queue and is repeatedly assigned to transmit data packets stored in the storage queue using the device driver layer 230, the data structure 250, and the network device 240.

Figure 10A:
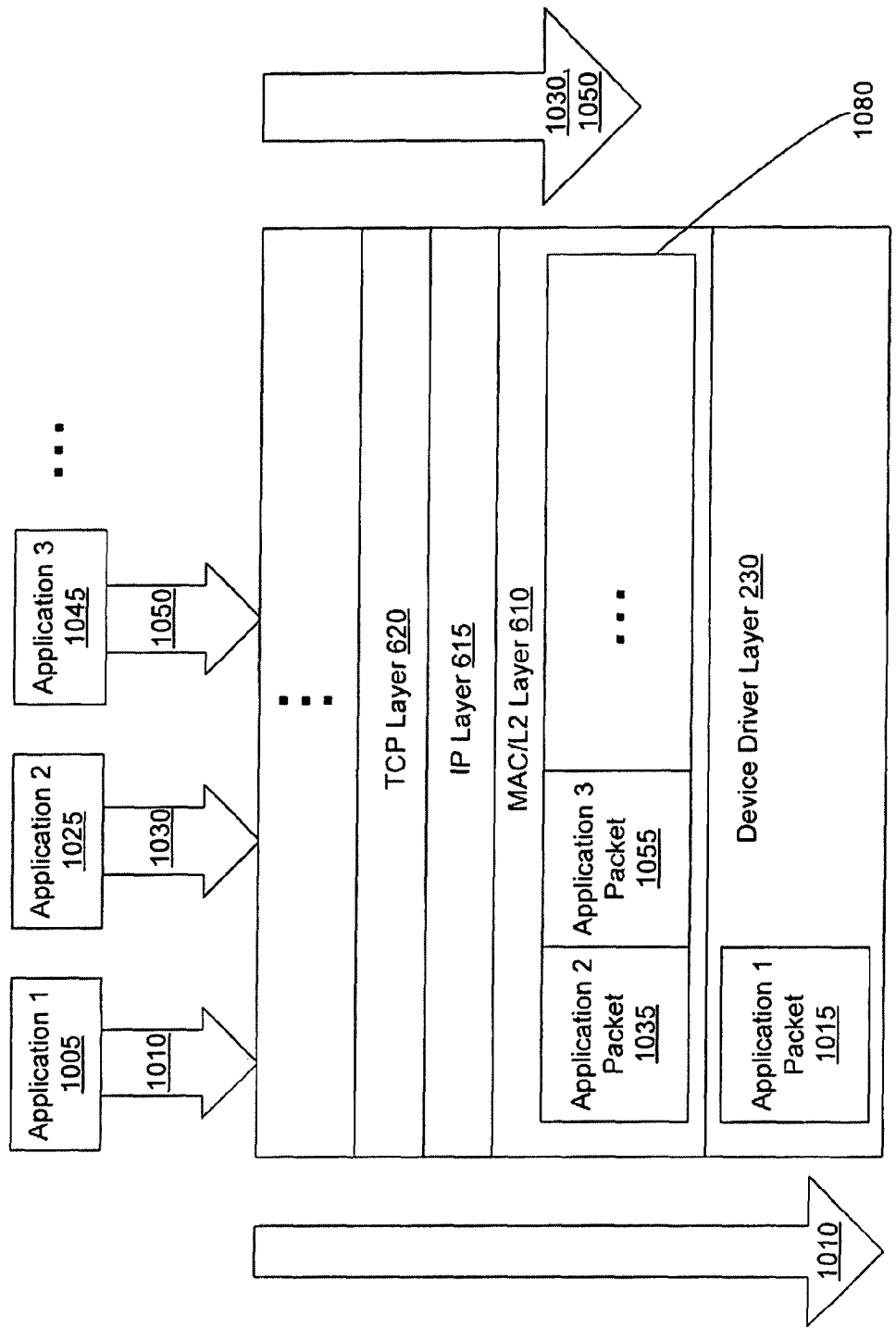
FIGS. 10A-B show conceptual diagrams of a storage queue that is implemented on a software layer of the operating system.
Figure 10B:
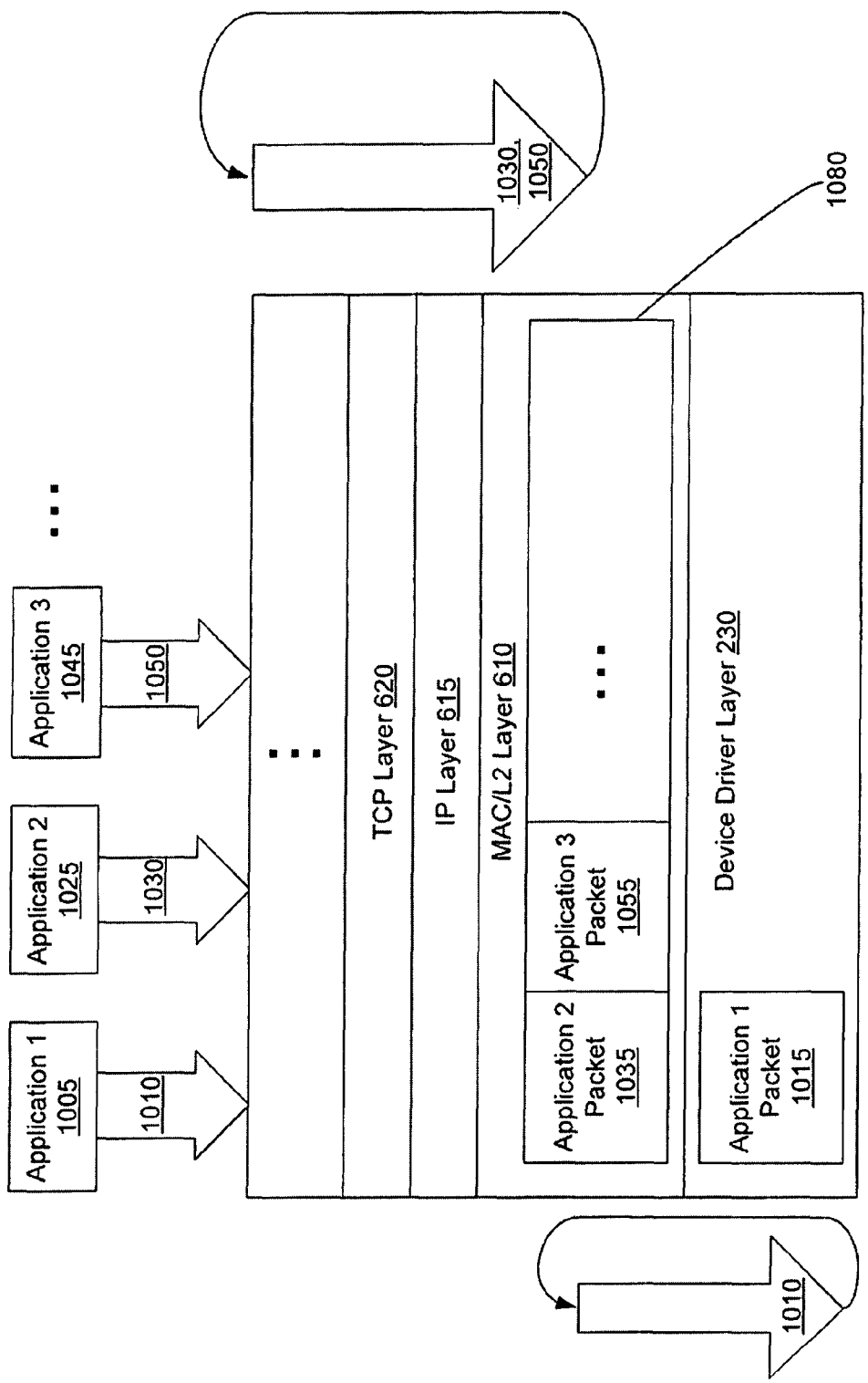

FIGS. 10A-B show conceptual diagrams of a storage queue 1080 that is implemented on the MAC/L2 software layer 610 of the operating system. The example shown in FIGS. 10A-B is for illustrative purposes only, and in other embodiments, the storage queue 1080 is implemented on a different software layer of the operating system in the example shown in FIG. 10A, a first transmitting thread 1010 is assigned to transmit a first data packet 1015 for a first application 1005, a second transmitting thread 1030 is assigned to transmit a second data packet 1035 for a second application 1025, and a third transmitting thread 1050 is assigned to transmit a third data packet 1055 for a third application 1045.

In the example of FIG. 10A, the first transmitting thread 1010 is the first transmitting thread to arrive at the MAC layer 610 (i.e., is the first transmitting thread to begin execution of the MAC layer 610 to process its assigned data 1015), the second transmitting thread 1030 is the second transmitting thread to arrive at the MAC layer 610, and the third transmitting thread 1050 is the third transmitting thread to arrive at the MAC layer 610. As such, after completing execution of the particular software layer which processes its assigned data 1015, the first transmitting thread 1010 is permitted access to the data structure (at the device driver layer) to operate the network device to transmit its assigned data packet 1015. After completing execution of the particular software layer which processes its assigned data, the second transmitting thread 1030 stores its assigned data packet 1035 to the storage queue 1080 and the third transmitting thread 1050 also stores its assigned data packet 1055 to the storage queue 1080.

As shown in FIG. 10B, the second and third transmitting threads 1030 and 1050 are then repeatedly assigned new data to transmit for various applications, which are then repeatedly stored to the storage queue 1080. As shown in FIG. 10B, after the first transmitting thread 1010 completes transmission of its assigned packet 1015 in the device driver layer, it returns to the MAC layer 610 having the storage queue 1080 and is assigned to transmit the second and third data packets 1035 and 1055 stored in the storage queue 1080 using the device driver layer 230, the data structure 250, and the network device 240. Thereafter, the first transmitting thread 1010 repeatedly returns to the storage queue 1080 and is repeatedly assigned to transmit new data packets stored in the storage queue.

In this manner, only the first arriving transmitting thread accesses the data structure at the device driver layer and the later arriving transmitting threads store their assigned data packets to the storage queue, the stored data packets being later assigned to the first transmitting thread to complete their transmission. As such, protection is provided against two transmitting threads simultaneously accessing the data structure, and thus information inconsistencies in the data structure may be mitigated. By providing this protection at a particular software layer above the device driver layer 230, only the particular software layer requires reconfiguration/modification, which eliminates the need to reconfigure/modify each device driver 230 used in the operating system 224 to provide this protection (discussed further below). In addition, by allowing later arriving transmitting threads to store their assigned data packets to a storage queue and return to be assigned new data to process, the later arriving transmitting threads are continually processing data to be transmitted rather than waiting for a transmitting thread currently accessing the data structure to complete transmission. As such, down time of transmitting threads may be reduced and data transmission performance further increased. Also, by providing protection In some embodiments, protection at the device driver layer is implemented to prevent two transmitting threads from concurrently accessing the data structure. In these embodiments, the device driver 230 and operating system 224 are configured to provide a locking feature for transmitting threads 236 so that only one transmitting thread 236 (and one receiving thread 235) may access a data structure at the same time. The locking utility module of the operating system 224 and the device driver 230 may be configured to work in conjunction to provide the transmitting thread locking feature. The device driver 230 may be configured so that the data structure is used to store information regarding which transmitting thread currently has access to the data structure at any given time (referred to as the transmitting thread "having the lock"). The locking utility module may be configured so that it allows access to the data structure by only the one transmitting thread "having the lock" (and prevent other transmitting threads from accessing the data structure). Since each network device only has one receiving thread available for use, a locking feature for receiving threads is typically not required to ensure that only one receiving thread accesses the data structure at the same time.

Figure 11:
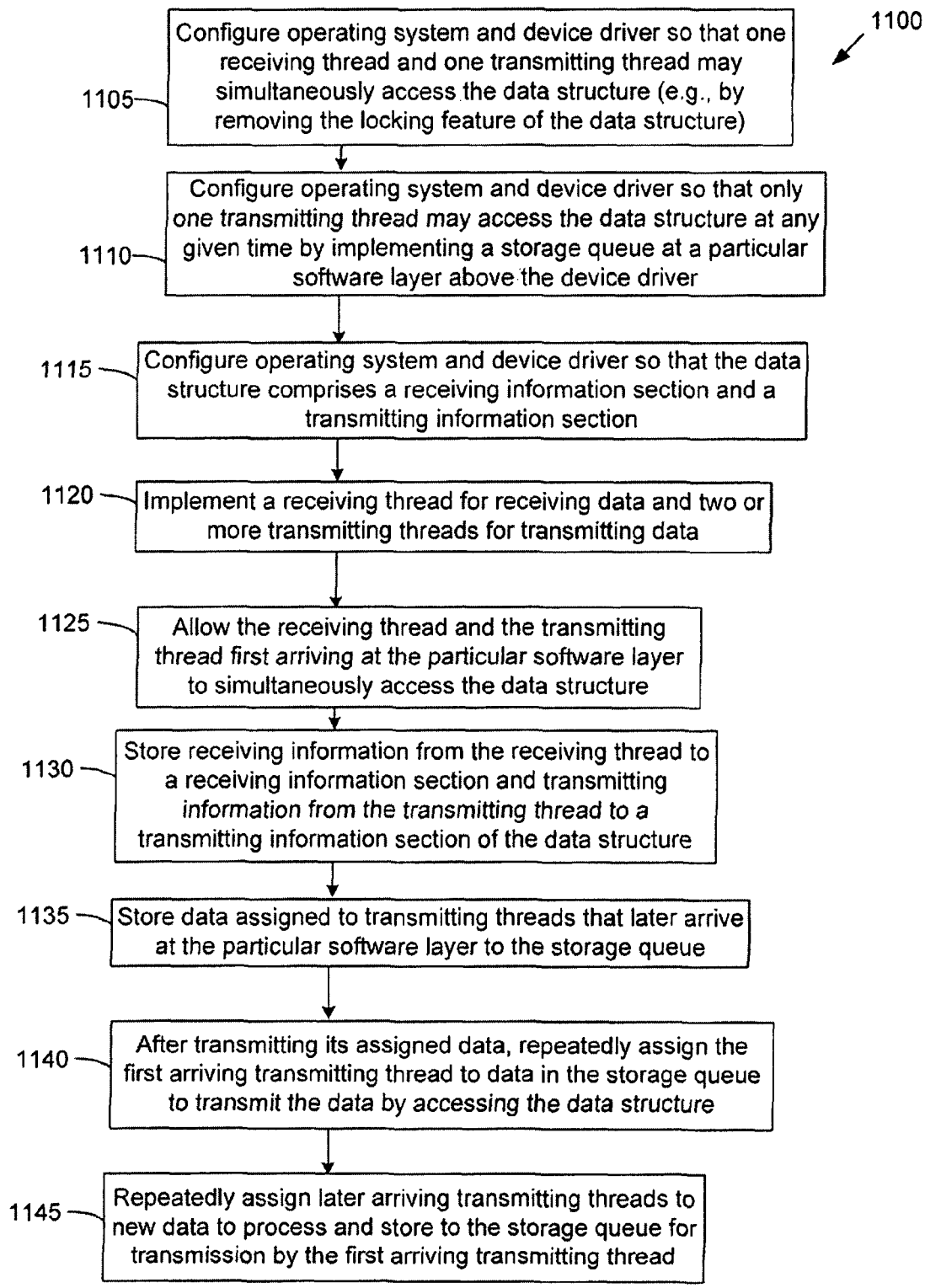
FIG. 11 is a flowchart of a method for configuring and operating a storage system to simultaneously receive and transmit data using a network device and a storage queue.

FIG. 11 is a flowchart of a method 1100 for configuring and operating a storage system 120 to simultaneously receive and transmit data over a network using a network device 240 and a storage queue 1080. In some embodiments, the method 1100 is implemented by software and/or hardware. In some embodiments, the steps of method 1100 are performed by various components of the storage system 120, such as a network device 240, an operating system 224 providing one or more receiving or transmitting threads and a device driver 230 that provides a data structure for use by the receiving or transmitting threads. The order and number of steps of the method 1100 are for illustrative purposes only and, in other embodiments, a different order and/or number of steps are used.

At step 1105 of the method 1100, the operating system and device driver are configured so that one receiving thread and one transmitting thread may simultaneously access the data structure (and thus simultaneously use the network device 240 to receive or transmit data over a network). For example, the locking feature of the data structure may be removed in the operating system and the device driver. The operating system and/or device driver may be further configured (at 1110) so that only one transmitting thread may access the data structure at any given time by implementing a storage queue 1080 at a particular software layer above the device driver to ensure that only one transmitting thread may access the data structure at any given time.

The operating system and/or device driver may also be configured (at 1115) so that the data structure comprises a receiving information section 905 and a transmitting information section 910 and the receiving threads only store information to the receiving information section and the transmitting threads only store information to the transmitting information section. For example, the receiving information section 905 may comprise a first continuous range of addresses in a memory of the storage system and the transmitting information section 910 may comprise a second continuous range of addresses in the memory, the sections 905 and 910 comprising non-overlapping sub-sections of the data structure.

The method 1100 then implements (at 1120) a receiving thread for receiving data over a network and two or more transmitting threads for transmitting data over a network. The method then allows (at 1125) the receiving thread and the transmitting thread first arriving at the particular software layer (having the storage queue 1080) to simultaneously access the data structure for reading or storing information to receive or transmit data using the network device. The method stores (at 1130) receiving information from the receiving thread to a receiving information section of the data structure and transmitting information from the transmitting thread to a transmitting information section of the data structure.

The method 1100 then stores (at 1135) data assigned to transmitting threads that later arrive at the particular software layer to the storage queue. After transmitting its assigned data, the first arriving transmitting thread is then repeatedly assigned (at 1140) to the data in the storage queue to transmit the data by accessing the data structure and using the network device. The later arriving transmitting threads are then repeatedly assigned (at 1145) new data to be transmitted to process and store to the storage queue for transmission by the first arriving transmitting thread.

Figure 12:
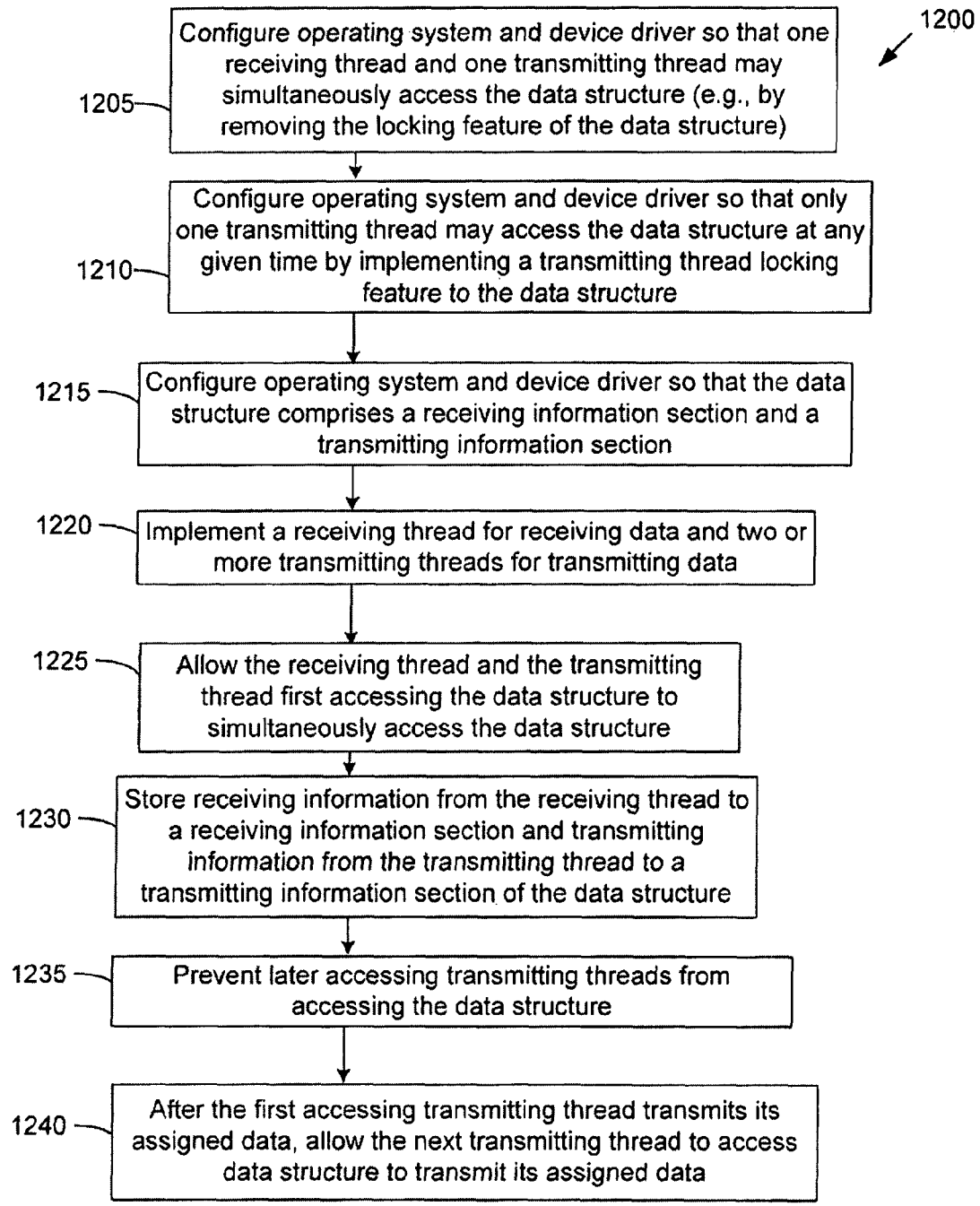
FIG. 12 is a flowchart of a method for configuring and operating a storage system 120 to simultaneously receive and transmit data using a network device and a transmitting thread locking feature.

FIG. 12 is a flowchart of a method 1200 for configuring and operating a storage system 120 to simultaneously receive and transmit data over a network using a network device 240 and a transmitting thread locking feature. In some embodiments, the method 1200 is implemented by software and/or hardware. In some embodiments, the steps of method 1200 are performed by various components of the storage system 120, such as a network device 240, an operating system 224 providing one or more receiving or transmitting threads, and a device driver 230 that provides a data structure for use by the receiving or transmitting threads. The order and number of steps of the method 1200 are for illustrative purposes only and, in other embodiments, a different order and/or number of steps are used.

At step 1205 of the method 1200, the operating system and device driver are configured so that one receiving thread and one transmitting thread may simultaneously access the data structure (and thus simultaneously use the network device 240 to receive or transmit data over a network). For example, the locking feature of the data structure may be removed in the operating system and the device driver. The operating system and/or device driver may be further configured (at 1210) to provide a transmitting thread locking feature to the data structure to ensure that only one transmitting thread may access the data structure at any given time. The operating system and/or device driver may also be configured (at 1215) so that the data structure comprises a receiving information section 905 and a transmitting information section 910 and the receiving threads only store information to the receiving information section and the transmitting threads only store information to the transmitting information section.

The method 1200 then implements (at 1220) a receiving thread for receiving data over a network and two or more transmitting threads for transmitting data over a network. The method then allows (at 1225) the receiving thread and the transmitting thread first accessing the data structure to simultaneously access the data structure for reading or storing information to receive or transmit data using the network device. The method stores (at 1230) receiving information from the receiving thread to a receiving information section of the data structure and transmitting information from the transmitting thread to a transmitting information section of the data structure.

The method 1200 prevents (at 1235) later accessing transmitting threads (threads that attempt to access the data structure after the first accessing transmitting thread and before the first accessing transmitting thread has finished transmitting its assigned data) from accessing the data structure. After the first accessing transmitting thread transmits its assigned data, the method then allows (at 1240) the next transmitting thread to access data structure to transmit its assigned data.

As discussed above, some embodiments removing the locking feature of the data structure of a network device and provide protections against information inconsistencies in the data structure to allow full duplex operation of the network device. As such, the full bandwidth capability of network devices that are hardware capable of full duplex operation may be realized and overall network data throughput may be increased. Network data transfer rates are an important performance factor for all devices that operate on a network. Network data transfer rates are especially important to server and storage systems implementing a network to transfer and store data.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems' registers and memories into other data similarly represented as physical quantities within the computer system.

The embodiments can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A computer system for receiving and transmitting data over a network, the computer system comprising:
    an operating system configured for:
        providing a receiving thread for receiving assigned data;
        providing first and second transmitting threads for transmitting assigned data and
        providing a storage queue for storing data
    a network device configured for simultaneously receiving and transmitting data over the network; and
    a memory for storing a data structure for access by the receiving thread to receive data and by the first transmitting thread to transmit data over the network using the network device;
    wherein the operating system is further configured for:
        operating the network device to simultaneously receive and transmit data over the network by allowing the receiving thread and first transmitting thread to simultaneously access the data structure configuring the second transmitting thread so it does not access the data structure, is repeatedly assigned data for transmitting, and repeatedly stores its assigned data to the storage queue; and configuring the first transmitting thread so it accesses the data structure and is repeatedly assigned to transmit data stored by the second transmitting thread, to the storage queue, by using the data structure and the network device.

2. The computer system of claim 1, wherein:

the receiving thread accesses the data structure to read or store receiving information to the data structure, the receiving information being used for receiving data using the network device; and the first transmitting thread accesses the data structure to read or store transmitting information to the data structure, the transmitting information being used for transmitting data using the network device.

3. The computer system of claim 2, wherein:

receiving information comprises a number of data packets received, address locations of the received data packets, or size of each data packet received; and transmitting information comprises a number of data packets transmitted or address locations of where data to be transmitted begins and ends.

4. The computer system of claim 1, wherein:

the operating system is further configured for partitioning the data structure into a first section comprising a first continuous range of addresses in the memory and a second section comprising a second continuous range of addresses in the memory, the receiving thread accessing only the first section and the first transmitting thread accessing only the second section.

5. The computer system of claim 1, wherein the operating system is further configured for providing a plurality of software layers for processing data assigned to transmitting threads, wherein:

the storage queue is implemented on a particular software layer; and the first transmitting thread allowed access to the data structure is the transmitting thread that first begins execution of the particular software layer to process its assigned data.

6. The computer system of claim 1, wherein:

the data structure is further configured to store information regarding which transmitting thread has permission to access to the data structure; and the operating system is further configured for preventing transmitting threads not having permission from accessing the data structure.

7. The computer system of claim 1, wherein:

the first transmitting thread is assigned data comprising at least a first data packet;

the second transmitting thread is assigned data comprising at least a second data packet and stores the second data packet to the storage queue; and after the first transmitting thread completes transmission of its assigned first data packet, it is assigned to transmit the second data packet stored in the storage queue.

8. A method for receiving and transmitting data over a network using a network device configured for simultaneously receiving and transmitting data over the network, the method comprising:

providing a receiving thread for receiving assigned data;

providing first and second transmitting threads for transmitting assigned data providing a storage queue for storing data storing a data structure for access by the receiving thread to receive data and by the first transmitting thread to transmit data over the network using the network device;

operating the network device to simultaneously receive and transmit data over the network by allowing the receiving thread and first transmitting thread to simultaneously access the data structure;

configuring the second transmitting thread so it does not access the data structure, is repeatedly assigned data for transmitting, and repeatedly stores its assigned data to the storage queue; and configuring the first transmitting thread so it accesses the data structure and is repeatedly assigned to transmit data stored by the second transmitting thread, to the storage queue, by using the data structure and the network device.

9. The method claim 8, wherein:

the receiving thread accesses the data structure to read or store receiving information to the data structure, the receiving information being used for receiving data using the network device; and the first transmitting thread accesses the data structure to read or store transmitting information to the data structure, the transmitting information being used for transmitting data using the network device.

10. The method of claim 9, wherein:

receiving information comprises a number of data packets received, address locations of the received data packets, or size of each data packet received; and transmitting information comprises a number of data packets transmitted or address locations of where data to be transmitted begins and ends.

11. The method of claim 8, further comprising:

partitioning the data structure into a first section comprising a first continuous range of addresses in the memory and a second section comprising a second continuous range of addresses in the memory, the receiving thread accessing only the first section and the first transmitting thread accessing only the second section.

12. The method of claim 8, further comprising:

providing a plurality of software layers for processing data assigned to transmitting threads, wherein the storage queue is implemented on a particular software layer and the first transmitting thread allowed access to the data structure is the transmitting thread that first begins execution of the particular software layer to process its assigned data.

13. The method of claim 8, further comprising:

store information to the data structure regarding which transmitting thread has permission to access to the data structure; and preventing transmitting threads not having permission from accessing the data structure.

14. The method of claim 8, wherein:

the first transmitting thread is assigned data comprising at least a first data packet;

the second transmitting thread is assigned data comprising at least a second data packet and stores the second data packet to the storage queue; and after the first transmitting thread completes transmission of its assigned first data packet, it is assigned to transmit the second data packet stored in the storage queue.

15. A computer readable medium having instructions stored thereon when executed, receive and transmit data over a network using a network device configured for simultaneously receiving and transmitting data over the network service, the computer readable medium comprising sets of instructions for:
- providing a receiving thread for receiving assigned data;
- providing first and second transmitting threads for transmitting assigned data
- providing a storage queue for storing data
- storing a data structure for access by the receiving thread to receive data and by the first transmitting thread to transmit data over the network using the network device;
- operating the network device to simultaneously receive and transmit data over the network by allowing the receiving thread and first transmitting thread to simultaneously access the data structure;
- configuring the second transmitting thread so it does not access the data structure, is repeatedly assigned data for transmitting, and repeatedly stores its assigned data to the storage queue; and
- configuring the first transmitting thread so it accesses the data structure and is repeatedly assigned to transmit data stored by the second transmitting thread, to the storage queue, by using the data structure and the network device.

16. The computer readable medium of claim 15, wherein:
- the receiving thread accesses the data structure to read or store receiving information to the data structure, the receiving information being used for receiving data using the network device; and
- the first transmitting thread accesses the data structure to read or store transmitting information to the data structure, the transmitting information being used for transmitting data using the network device.

17. The computer readable medium of claim 16, wherein:
- receiving information comprises a number of data packets received, address locations of the received data packets, or size of each data packet received; and
- transmitting information comprises a number of data packets transmitted or address locations of where data to be transmitted begins and ends.

18. The computer readable medium of claim 15, further comprising sets of instructions for:
- partitioning the data structure into a first section comprising a first continuous range of addresses in the memory and a second section comprising a second continuous range of addresses in the memory, the receiving thread accessing only the first section and the first transmitting thread accessing only the second section.

19. The computer readable medium of claim 15, further comprising sets of instructions for:
- providing a plurality of software layers for processing data assigned to transmitting threads, wherein the storage queue is implemented on a particular software layer and the first transmitting thread allowed access to the data structure is the transmitting thread that first begins execution of the particular software layer to process its assigned data.

20. The computer readable medium of claim 15, further comprising sets of instructions for:
- storing information to the data structure regarding which transmitting thread has permission to access to the data structure; and
- preventing transmitting threads not having permission from accessing the data structure.

21. The computer readable medium of claim 15, wherein:
- the first transmitting thread is assigned data comprising at least a first data packet;
- the second transmitting thread is assigned data comprising at least a second data packet and stores the second data packet to the storage queue; and
- after the first transmitting thread completes transmission of its assigned first data packet, it is assigned to transmit the second data packet stored in the storage queue.

* * * * *